Feb. 15, 1938.   J. A. DEVENDOR ET AL   2,108,255
BUTTON
Filed July 31, 1936   3 Sheets-Sheet 1
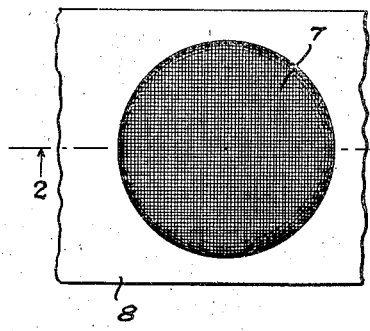
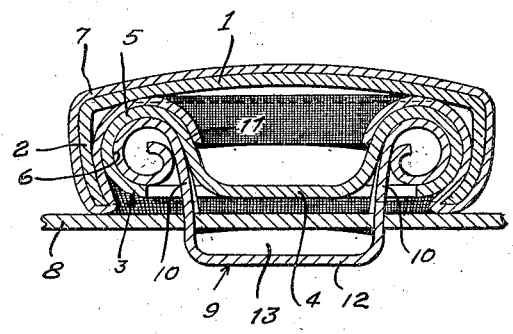
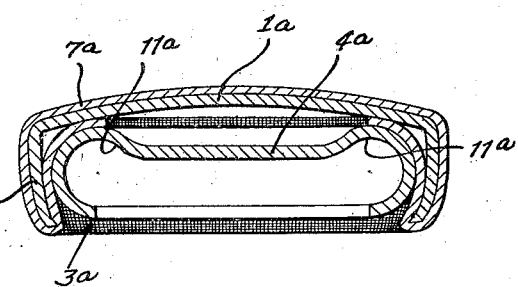
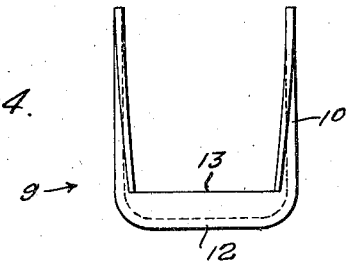
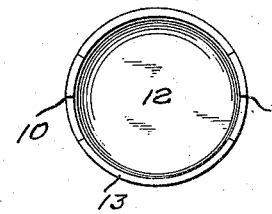
INVENTORS
JOHN A. DEVENDOR
WILLIAM A. DEVENDOR
BY
Clarence M. Crews
ATTORNEYS

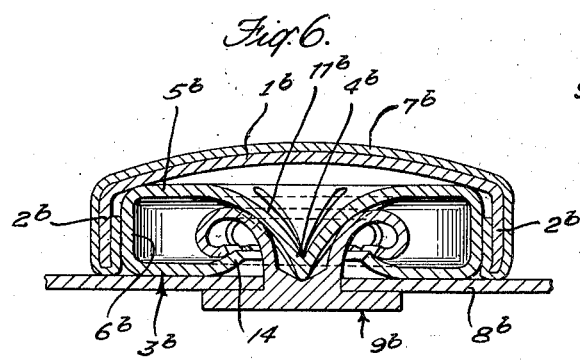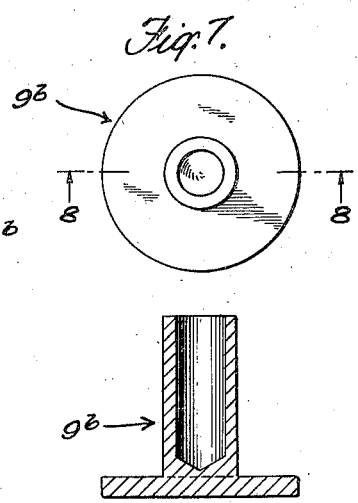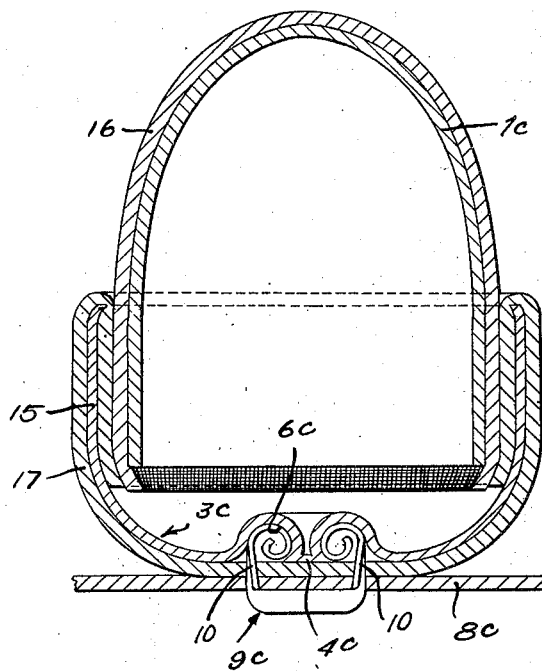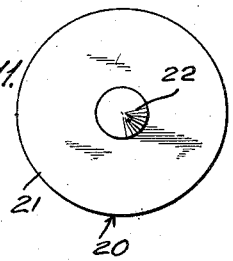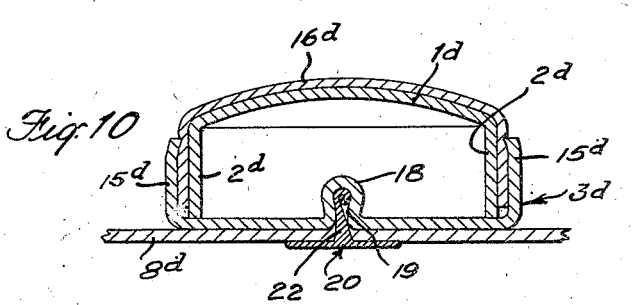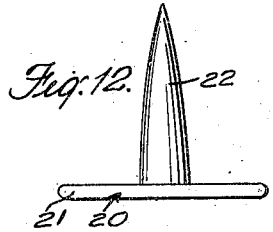

Feb. 15, 1938. J. A. DEVENDOR ET AL 2,108,255
BUTTON
Filed July 31, 1936 3 Sheets-Sheet 3

INVENTORS
JOHN A. DEVENDOR
WILLIAM A. DEVENDOR

BY Clarence M. Crews
ATTORNEY

Patented Feb. 15, 1938

2,108,255

UNITED STATES PATENT OFFICE 2,108,255

BUTTON

John A. Devendor and William A. Devendor, Jackson Heights, N. Y.

Application July 31, 1936, Serial No. 93,563

18 Claims. (Cl. 24—95)

This invention relates to buttons which may be used either for buttoning purposes or for purely ornamental purposes. The invention relates more particularly to buttons of the type in which the button proper comprises a top or shell and an associated collet, the collet being adapted to serve as an anvil for turning and clinching an attaching staple or eyelet. The button top is desirably covered with fabric, but it may be left uncovered if desired. In the latter case the button top is desirably plated or lacquered. In some forms both the button top and the collet are covered.

It is an important object of the invention to provide a construction which is very strong for its size and which is therefore capable of being used with an attaching member of heavy gauge metal capable of penetrating heavy fabrics or other sheet material. To this end it is a feature of the invention that the collet is formed with a prong turning surface and with circularly continuous bodies of metal integral with said surface at the inner and outer sides thereof. The inner body of metal is desirably a boss or nib for resisting the distortion strain to which the collet is subjected in the operation of clinching a sturdy attaching member. In such a construction the strain is distributed symmetrically around the center of the collet, so that by making the boss or nib of a strong enough construction to be substantially incompressible and inextensible, the strain may all be taken up without distortion of the collet or the button top. The nib or boss can be set at any height desired, depending upon the strain to be imposed upon it. By locating the nib below the bottom of the body proper the nib can be used to space the margin of the button from the fabric, thereby adapting the button to be used for buttoning purposes.

The principle of the invention is utilized both for clinching multi-pronged fasteners and eyelets which enter the collet around the center thereof, and for clinching single pronged fasteners such as nails which enter the collet at the center. It is applicable alike for clinching the prongs of multi-pronged fasteners outward or inward.

It is a further feature of the invention that the fastener prong or prongs are curled in each instance to form substantially complete rigid loops larger than the opening through which they entered, and rigidly interlocked with the collet.

Other objects and advantages will hereinafter appear.

In the drawings forming part of this specification:

Fig. 1 is a fragmentary plan view showing a button embodying features of the invention attached to a piece of sheet material;

Fig. 2 is a sectional view taken on the line 2—2 of Fig. 1 looking in the direction of the arrows;

Fig. 3 is a view of a button similar to that of Fig. 2 but of somewhat modified construction;

Fig. 4 is a view in elevation of a clinching staple utilized with the button of Fig. 2 or of Fig. 3;

Fig. 5 is a top plan view of the clinching staple of Fig. 4;

Fig. 6 is a view similar to Fig. 2 showing another form of button used with a clinching eyelet;

Fig. 7 is a top plan view of the eyelet of Fig. 6 in its original condition;

Fig. 8 is a sectional view taken on the line 8—8 of Fig. 7;

Fig. 9 is a view similar to Fig. 2 showing still another form of button attached by a clinching staple of the kind shown in Figs. 4 and 5;

Fig. 10 is a view similar to Fig. 2 showing still another form of button attached to a piece of fabric;

Fig. 11 is a sectional plan view looking down on the attaching nail of Fig. 10;

Fig. 12 is a view in elevation showing the attaching nail of Fig. 10;

Figure 13:
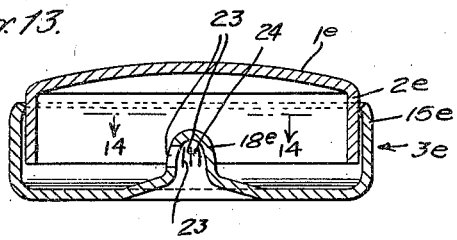
Fig. 13 is a sectional view showing a further form of button.

In the embodiment of Figs. 1, 2, 4 and 5 provision is made of a button top comprising a convex body 1 and an annular flange 2. Within the body member there is a collet 3 having a central body or nib 4 surrounded by a scroll-like marginal portion 5 which bears indirectly against the body member 1 and which defines an annular channel 6. The nib 4 lies in substantially the same horizontal plane as the terminal or edge portion of the collet. A piece of covering fabric 7 is wrapped around the body, and has its margin gripped firmly between the flange 2 and the collet by a swaging operation.

The button is placed upon a piece of fabric or other sheet material 8 and attached to it by driving a clinching staple 9 through the fabric and into the channel 6. The prongs 10 of the staple 9 engage inclined prong turning wall portions 11 which incline upward and outward from the central nib 4. These walls merge smoothly and continuously into the outer marginal portion 5 of the collet so that the prongs are caused to follow the channel walls around and to be clinched in substantially the shape shown in Fig. 2. The prongs form substantially complete rigid loops which are too large to escape through the entrance opening and which interlock rigidly with the collet. The walls 11 are also unbrokenly united with the nib, being integral with it. The strong construction afforded by having a solid nib or body member 4 disposed between the walls 11 enables the staple to be made of rather heavy gauge metal so that the staple is adapted to penetrate heavy fabrics without distortion and to form a strong and firm means of attachment.

The staple, itself, comprises a central body portion 12 having an annular flange 13, and the prongs 10 are, in effect, merely extensions of this flange. By virtue of this construction the prongs may be long and they may be very strong at their junction with the collet body since they are not bent and thereby weakened in turning them down from the plane of the body. In other words, the fact that the bend occurs in the body itself at the junction of the body with the flange saves the staple prongs from any preliminary distortion or weakening.

The button of Fig. 3 is quite similar to that of Fig. 2 and differs only in the fact that the central nib 4a is disposed in a substantially higher plane than the central nib 4 of Fig. 2. The nib 4a, however, is depressed far enough to cause it to be bounded by outwardly and upwardly extending surfaces 11a which start the bending of the staple prongs outward. Since the button of Fig. 3 is in all respects the same as the button of Fig. 2, corresponding reference numerals have been applied with the subscript "a" added. Further description is deemed unnecessary.

The button of Fig. 6 comprises a top member which includes a body 1b and an annular flange 2b, both covered with a flexible cover 7b which is gripped against the periphery of a collet member 3b. The collet member 3b has a central nib 4b which comes down substantially to a point at the middle of the button. Surfaces 11b extend upward and outward from the central nib and merge into a marginal portion 5b which defines an annular channel 6b. The surfaces 11b are ribbed to strengthen them and to facilitate splitting of eyelet metal into substantially equal sections or prongs. The marginal portion 5b terminates in an inturned and upturned lip 14. The button is attached to a piece of fabric 8b by driving an eyelet 9b through the fabric. The eyelet shank strikes against the surface 11b and is split and curled outward by the surface 11b substantially to the shape shown in Fig. 6, the extremities of the curled portion bearing upon the flange 14. The lower surface of the collet adjacent the flange 14 extends in a plane substantially flush with the lower margin of the covered flange 2b so that the eyelet body and the collet cooperate to grip the fabric firmly between them.

In Fig. 9 disclosure is made of an acorn type button, the construction being such that the clinching staple is curled inward instead of outward as in the preceding figures. The button top comprises a dome-shaped member 1c which extends within an upturned flange 15 formed on a collet 3c. Covers 16 and 17 of fabric are provided for the button top and for the collet, and these cover members are both marginally gripped between the button top and the collet flange. The collet, near its lower central portion, is formed to provide an annular channel 6c for receiving the prongs of a clinching staple 9c. The channel is substantially circular in cross section save for the entrance opening at its lower side. A nib or boss 4c connects the inner walls of the channels to provide a firm and solid support for the channel walls. The button is attached to a piece of sheet material 8c by means of a clinching staple 9c. The nib 4c is desirably located substantially in the plane of the bottom face of the collet body so that the prong clinching surface is located above the nib.

The button of Fig. 10 comprises a top which includes a body member 1d and a downturned peripheral flange 2d. The button also comprises a collet member 3d having an upturned peripheral flange 15d. The top is covered with a piece of fabric 16d whose margin is gripped between the flanges 2d and 15d. The collet is formed with an unbroken internal boss 18 which has a central socket 19 for deforming and interlocking with the shank of a nail 20. The socket is of larger cross section than the socket mouth. The nail 20 is driven through a sheet 8d and deformed to a shape something like that illustrated in Fig. 10 by engagement with the inner surface of the boss 18. The bottom of the collet forms the bottom of the button and desirably lies in a single plane. The nail head cooperates with the collet body to grip the sheet material firmly. The nail 20 comprises a head 21 and a tapered shank 22 which may be of the shape illustrated in Fig. 12.

Figure 17:
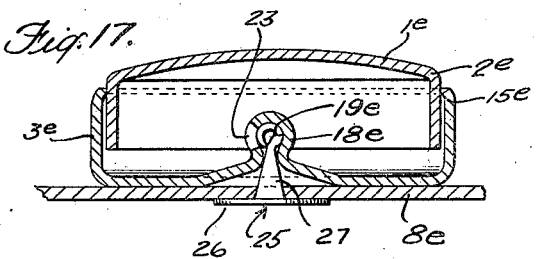
Fig. 17 is a view similar to Fig. 13 showing the same button attached to a piece of fabric.
Figure 19:
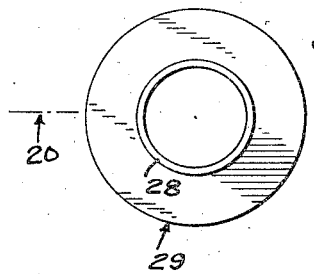
Fig. 19 is a plan view looking down on the attaching member of Fig. 18 before the attaching member has been distorted.

The button of Figs. 13 and 17 is similar to that of Fig. 10. In common with all of the other forms of buttons illustrated in this application it may be left uncovered if desired and in this instance it is illustrated as not covered.

Figure 15:
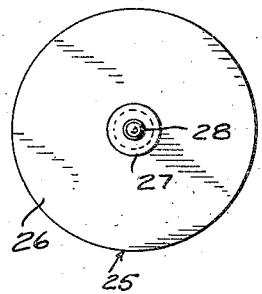
Fig. 15 is a plan view looking down on the attaching member which is used in connection with the button of Fig. 13.
Figure 14:
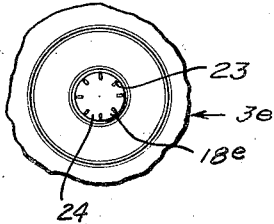
Fig. 14 is a fragmentary plan view of the central portion of the collet of Fig. 13; taken on line 14—14 of Fig. 13 looking in the direction of the arrows.
Figure 16:
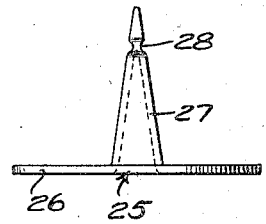
Fig. 16 is a view in elevation of the attaching member of Fig. 15.

With the exception of the construction of the central boss 18e this button is substantially a duplicate of the button of Fig. 10. Hence corresponding reference numerals have been applied to corresponding parts with the subscript "e" added and no further description is deemed necessary. The central boss 18e, however, has its upstanding wall portion divided by a series of slots 23 so that this wall forms a multiplicity of deformable tongues 24. The button is secured to a piece of sheet material by means of a nail 25 as illustrated in Figs. 15 and 16. This nail comprises a head 26 and a tapered shank 27 having a relatively narrow neck portion 28 near the tip to facilitate bending. The socket 19e within the boss 18e is initially of cylindrical or tapering cross section but the driving of the nail into the socket causes the engaged tongues 24 to bend outward so that the upset end of the nail may become larger than the entrance passage to the socket through which it entered.

Figure 18:
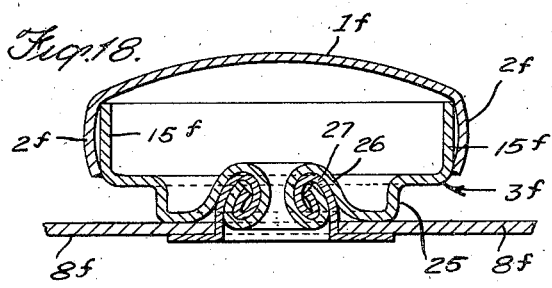
Fig. 18 is a view similar to Fig. 2 showing still another form of button attached to a piece of fabric.
Figure 20:
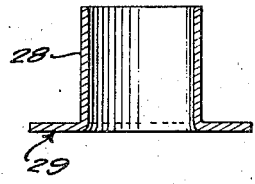
Fig. 20 is a sectional view taken on the line 20—20 of Fig. 19 looking in the direction of the arrows.

The button of Fig. 18 includes a top which comprises a body member If and a downturned peripheral flange 2f. The button also comprises a collet member 3f having an upturned peripheral flange 15f. The collet is received within and gripped by the marginal flange 2f of the button top. This button is also illustrated as uncovered although it might be covered like the buttons of Figs. 2, 3 and 6. In this instance the collet is formed with a downwardly extending flange 25 at a short distance inward from the periphery of the collet, the purpose being to space the button body away from the fabric 8f so that the button may be used for buttoning purposes rather than for mere ornamentation. Located inward beyond the downturned flange 25 is a scroll-like boss 26 which defines an annular channel 27 adapted to receive and clinch the shank portion 28 of an eyelet 29. In this instance there is no solid nib filling the space surrounded by the annular channel but the button is of very strong construction because of the arched effect given to it by the scroll.

The feature illustrated in Fig. 15 of forming the collet with a central spacing boss to adapt the button to be used for buttoning, may be incorporated in buttons of the kind shown in any of the other figures.

While round buttons having round anvils have been illustrated herein, it is to be understood that the button shape may be varied (as oval, square, hexagon, etc.) and that the anvil shape would in each case be varied as required.

While we have illustrated and described in detail certain preferred forms of our invention, it is to be understood that changes may be made therein and the invention embodied in other structures. We do not, therefore, desire to limit ourselves to the specific constructions illustrated, but intend to cover our invention broadly in whatever form its principle may be utilized.

We claim:

1. In a button, in combination, a button top having a body portion and a downturned peripheral flange, and a one-piece collet interfitting with the button top in gripping relation thereto and constituting the button back, said collet being formed to provide a circularly uninterrupted fastener receiving opening bounded by a fastener turning surface and including circularly continuous bodies of metal integral with the turning surface at the inner and outer sides of the opening.

2. In a button, in combination, a button top having a body portion and a downturned peripheral flange, and a one-piece collet received in the button top and gripped by the flange thereof and constituting the button back, said collet comprising a central nib and a continuously open-mouthed fastener receiving and trapping channel surrounding the nib, said channel including an uninterrupted fastener engaging and supporting wall adjacent the nib which extends upward from the nib toward the body portion of the button top.

3. In a button, in combination, a button top having a body portion and a downturned peripheral flange, and a one-piece collet received in the button top and gripped by the flange thereof and constituting the button back, said collet comprising a central nib and a continuously open-mouthed fastener receiving and trapping channel surrounding the nib, said channel including an uninterrupted fastener deflecting wall which extends upward and outward from the nib toward the body portion of the button top.

4. In a button, in combination, a button top having a body portion and a downturned peripheral flange, a collet received in the button top and gripped by the flange thereof, and a fabric cover extending around the top and continuously gripped by the collet and the flange of the button top, said collet comprising a central nib and an unbroken fastener turning surface surrounding the nib and extending upward and outward therefrom and providing a continuous fastener receiving and supporting channel around the nib.

5. In a button, in combination, a button top having a body portion and a downturned peripheral flange, a collet received in the button top and gripped by the flange thereof, and a fabric cover extending around the top and continuously gripped by the collet and the flange of the button top, said collet comprising a central nib and an unbroken fastener turning surface surrounding the nib and extending upward and outward therefrom and providing a continuous fastener receiving and supporting channel around the nib, the nib being located in substantially the same plane with the marginal portion of the collet.

6. In a button, in combination, a button top having a body portion and a downturned peripheral flange, a collet received in the button top and gripped by the flange thereof, and a fabric cover extending around the top and continuously gripped by the collet and the flange of the button top, said collet comprising a central nib and an unbroken fastener turning surface surrounding the nib and extending upward and outward therefrom and providing a continuous fastener receiving and supporting channel around the nib, the nib being located within the button top and in a plane between the upper and lower extremities of the collet.

7. In combination, a button comprising a button top having a body portion and a downturned peripheral flange and a collet interfitting with the button top in gripping relation thereto, said collet being formed to provide a circularly uninterrupted fastener receiving opening bordered by a fastener turning surface and including circularly continuous bodies of metal integral with the turning surface at the inner and outer sides of the turning surface, and a fastening staple clinched to the collet comprising a dome shaped body which terminates in an annular flange and prongs which form direct continuations of the flange.

8. In a button, in combination, a button top having a body portion and a downturned peripheral flange, a collet received in the button top and gripped by the flange thereof, and a fabric cover extending around the top and continuously gripped by the collet and the flange of the button top, said collet comprising an unbroken central nib and an unbroken fastener turning surface surrounding the nib and extending upward and outward therefrom and providing a continuous fastener receiving and supporting channel around the nib, the nib being pointed and terminating substantially flush with the marginal portion of the collet and being surrounded by an upturned lip which forms a flared mouth for receiving and guiding a fastener and a support for the curled over-extremities of the fastener.

9. In a button, in combination, a button top having a body portion and a downturned peripheral flange, and a collet having an upturned flange, said flanges being associated in gripping relation, and said collet being formed with a central nib and with an annular channel extending around and over the nib, said channel having an outer wall adapted to intercept the tip portions of a fastener and turn them inward into the portion of the channel overlying the nib.

10. In a button, in combination, a button top having a body portion and a downturned peripheral flange, and a one-piece collet having an upturned flange, said collet having an unbroken bottom formed with a central open mouthed socket of greater transverse area than the socket mouth to receive, deform and interlock with the end of a fastener.

11. In a button, in combination, a button top having a body portion and a downturned peripheral flange, and a one-piece collet having an upturned flange, said collet having an unbroken bottom formed with a central open mouthed socket of greater transverse area than the socket mouth to receive, deform and interlock with the end of a fastener, the collet bottom constituting also the button bottom and lying substantially in a single plane.

12. In a button, in combination, a button top having a body portion and a downturned peripheral flange, and a collet having an upturned flange, said collet having a bottom formed with a central socket to receive, deform and interlock with the shank of a fastener, said socket having the walls thereof divided into deformable tongues so that the interior of the socket may be deformed by the fastener shank to a greater cross sectional area than the area of the socket mouth.

13. In a button, in combination, a button top having a body portion and a downturned peripheral flange, and a collet having an upturned peripheral flange and a central socket, said top and collet flanges being associated in gripping relation, and said socket being widest at its mouth but having deformable upstanding walls adapted to be spread by the driving of a fastener into the socket to permit the portion of the fastener which enters the socket to be deformed to a shape and size positively preventing withdrawal through the socket mouth.

14. In a button, in combination, a button top having a body portion and a downturned peripheral flange, and a collet having an upturned marginal flange, said flanges being associated in gripping relation, and said collet also including a central downwardly offset portion forming a spacing boss, said central portion also including a circularly continuous, upwardly and inwardly extending clinching surface and a circularly continuous scroll-like continuation of said surface disposed inwardly therefrom and terminating in an upturned lip for interlocking with a fastening member deformed by the surface.

15. In a button, in combination, a button top having a body portion and a downturned peripheral flange, and a collet having an upturned marginal flange, said flanges being associated in gripping relation, and said collet also including an upwardly and inwardly extending fastener bending surface, and a circularly continuous scroll portion disposed inwardly from said surface and forming a continuation thereof terminating in an upturned lip for interlocking with a fastening member deformed by the bending surface.

16. In a button, in combination, a button top having a body portion and a downturned peripheral flange, a collet associated in gripping relation with said flange, said collet having a circularly continuous opening for receiving a fastener, a circularly continuous fastener bending surface in line with the opening, and circularly continuous bodies of metal forming continuations of said surface at the inner and outer sides thereof, and a fastener inserted in said opening and bent through a full turn to form a rigid body within the collet of larger size than the entrance opening.

17. In a button, in combination, a button top having a body portion and a downturned peripheral flange, a collet associated in gripping relation with the flange of the button top, said collet being formed to provide a circularly uninterrupted eyelet receiving opening and having an uninterrupted eyelet turning surface in line with said opening, said eyelet turning surface including uniformly spaced radial ribs to facilitate the splitting of an eyelet tube into substantially equal sections.

18. In a button, in combination, a button top having a body portion and a downturned peripheral flange, a collet associated in gripping relation with the flange of the button top and a cover of flexible sheet material convering and enclosing the collet and gripped between the collet and the flange of the button top, said collet being formed with a clinching anvil within the cover for clinching a fastener after it has penetrated the cover.

JOHN A. DEVENDOR.
WILLIAM A. DEVENDOR.